United States Patent
Ma et al.

(10) Patent No.: US 11,440,811 B2
(45) Date of Patent: Sep. 13, 2022

(54) TERNARY PRECURSOR PARTICLES AND METHOD FOR MANUFACTURING THE SAME

(71) Applicant: XTC New Energy Materials(Xiamen) LTD., Xiamen (CN)

(72) Inventors: Yue-Fei Ma, Xiamen (CN); Jun Zheng, Xiamen (CN)

(73) Assignee: XTC New Energy Materials(Xiamen) LTD., Xiamen (CN)

( * ) Notice: Subject to any disclaimer, the term of this patent is extended or adjusted under 35 U.S.C. 154(b) by 281 days.

(21) Appl. No.: 16/504,537

(22) Filed: Jul. 8, 2019

(65) Prior Publication Data
US 2019/0359497 A1 Nov. 28, 2019

Related U.S. Application Data

(63) Continuation-in-part of application No. PCT/CN2017/113324, filed on Nov. 28, 2017.

(51) Int. Cl.
*C01G 53/04* (2006.01)
*H01M 4/505* (2010.01)
(Continued)

(52) U.S. Cl.
CPC .......... *C01G 53/04* (2013.01); *C01G 53/006* (2013.01); *H01M 4/505* (2013.01); *H01M 4/525* (2013.01);
(Continued)

(58) Field of Classification Search
CPC ..... C01G 53/04; C01G 53/006; H01M 4/505; H01M 4/525; H01M 10/0525;
(Continued)

(56) References Cited

U.S. PATENT DOCUMENTS 7,585,432 B2 * 9/2009 Ito ..................... H01B 1/08
252/500

FOREIGN PATENT DOCUMENTS

CN 104347866 2/2015
CN 105399154 3/2016
(Continued)

OTHER PUBLICATIONS

Longwei Liang et al:"Synthesis and characterization of concentration-gradient LiNi0.6Co0.2Mn0.2O2 cathode material for lithium ion batteries", Journal of Alloys and Compounds, Elsevier Sequoia, Lausanne, CH, vol. 613, May 28, 2014(May 28, 2014), pp. 296-305, XP029035091, ISSN:0925-8388, DOI:10.1016/J.JALLCOM.2014.05.027.

*Primary Examiner* — Anthony J Zimmer
(74) *Attorney, Agent, or Firm* — ScienBiziP, P.C.

(57) ABSTRACT

Ternary precursor particles used for a lithium-ion battery, the ternary precursor particles having a $Ni_xCo_yMn_z(OH)_2$, wherein, $x+y+z=1$, $0<x<1$, $0<y<1$, $0<z<1$; each ternary precursor particle is a spheroidal structure, and comprises a shell, a transition layer and a particle core; the shell is a dense structure, the particle core is a porous structure, the transition layer surrounds the particle core and is sandwiched between the shell and the particle core; each ternary precursor particle is a mixture formed by mixing the nickel hydroxide, the cobalt hydroxide and the manganese hydroxide at the atomic level; a crystallinity of the shell is greater than a crystallinity of the transition layer, and the crystallinity of the transition layer is greater than a crystallinity of the particle core.

12 Claims, 5 Drawing Sheets

(51) Int. Cl.
  *H01M 4/525* (2010.01)
  *H01M 10/0525* (2010.01)
  *C01G 53/00* (2006.01)

(52) U.S. Cl.
  CPC ..... *H01M 10/0525* (2013.01); *C01P 2004/61* (2013.01); *C01P 2006/11* (2013.01); *C01P 2006/40* (2013.01)

(58) Field of Classification Search
  CPC .............. H01M 4/1391; H01M 4/131; H01M 2004/028; H01M 4/366; H01M 10/052; C01P 2004/61; C01P 2006/11; C01P 2006/40; C01P 2004/84; C01P 2004/52; C01P 2004/01; Y02E 60/10
  See application file for complete search history.

(56) References Cited

FOREIGN PATENT DOCUMENTS

| | | | | |
|---|---|---|---|---|
| CN | 105399154 A | * | 3/2016 | |
| CN | 104852038 B | | 2/2017 | |
| CN | 107069023 | | 8/2017 | |
| CN | 107240712 A | | 10/2017 | |
| KR | 20130080565 A | | 7/2013 | |
| KR | 101564009 B1 | * | 10/2015 | ............ H01M 4/505 |

* cited by examiner

TERNARY PRECURSOR PARTICLES AND METHOD FOR MANUFACTURING THE SAME

CROSS-REFERENCE TO RELATED APPLICATIONS

This application is a continuation-in-part under 35 U.S.C. § 120 of international patent application PCT/CN2017/113324 filed Nov. 28, 2017.

FIELD

The subject matter herein generally relates to ternary precursor particles used in a lithium-ion battery and a method for manufacturing the ternary precursor particles.

BACKGROUND

A ternary material is a laminated nickel-cobalt-manganese composite positive electrode particle, comprises nickel, cobalt and manganese as main metal elements. Compared with $LiCoO_2$, $LiNiO_2$ or $LiMn_2O_4$, the ternary particles are low cost, with characteristics of large discharge capacity, excellent cycling performance and thermal stability, and stable structures. Through the synergistic effect of Ni—Co—Mn, combining the excellent cycling performance of the lithium cobaltate, the high specific capacity of the lithium nickelate, and the high safety and low cost of the lithium manganite, the ternary Ni—Co—Mn particles have demonstrated performances superior to single compounds.

Ternary precursor particles are the key raw materials for preparation of the ternary material. The physical and chemical properties of the ternary precursor particles such as the morphology, particle size distribution and crystal structure, directly affect the electrochemical properties of the ternary material, which in turns, directly restrict the application of the ternary material. Current methods for manufacturing the ternary precursor particles are difficult to control the internal structures of the ternary precursor particles, and the ternary material made of the current ternary precursor particles may not meet the requirements of on-board batteries.

BRIEF DESCRIPTION OF THE DRAWINGS

Implementations of the present disclosure will now be described, by way of embodiments, with reference to the attached figures.

DETAILED DESCRIPTION

Figure 1:
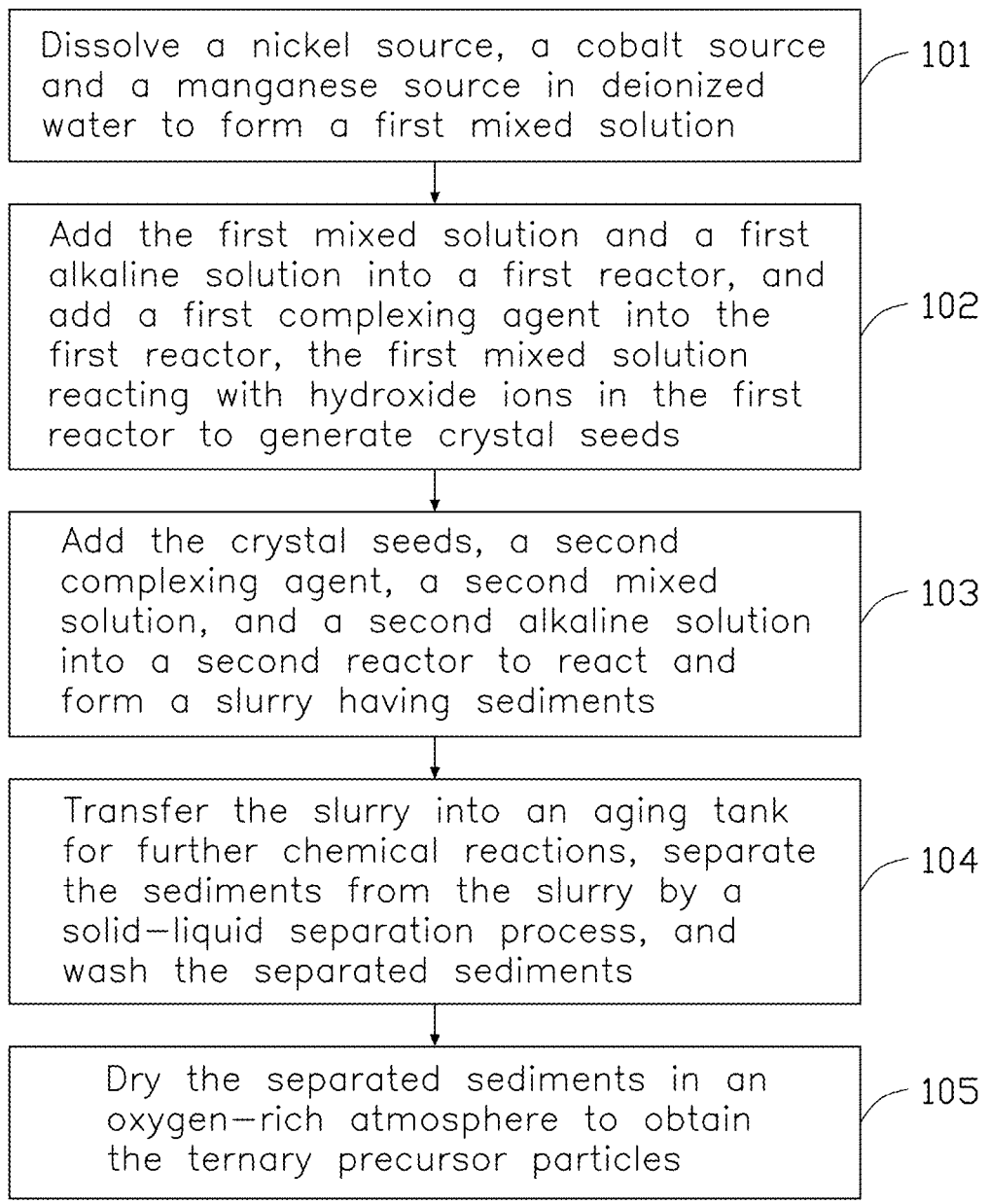
FIG. 1 is a flowchart of an embodiment of a method for manufacturing ternary precursor particles.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates a flowchart of a method in accordance with an embodiment. The embodiment for manufacturing ternary precursor particles is provided by way of embodiments, as there are a variety of ways to carry out the method. Each block shown in FIG. 1 represents one or more processes, methods, or subroutines carried out in the method. Furthermore, the illustrated order of blocks is can be changed. Additional blocks may be added or fewer blocks may be utilized, without departing from this disclosure. The method can begin at block 101.

At block 101, a first mixed solution is formed by dissolving a nickel source, a cobalt source and a manganese source in deionized water. The first mixed solution comprises nickel ions, cobalt ions and manganese ions.

The nickel source, the cobalt source and the manganese source are water-soluble salts. In at least one embodiment, the nickel source may be selected from a group consisting of nickel sulfate, nickel nitrate and nickel chloride, and any combination thereof. The cobalt source may be selected from a group consisting of cobalt sulfate, cobalt nitrate, cobalt chloride, and any combination thereof. The manganese source may be selected from a group consisting of manganese sulfate, manganese nitrate and manganese chloride, and any combination thereof.

At block 102, the first mixed solution and a first alkaline solution are added into a first reactor, and a first complexing agent is added into the first reactor. The first mixed solution reacts with hydroxide ions in the first reactor to generate crystal seeds.

In at least one embodiment, the first reactor can be a reaction kettle. In illustrated embodiment, the first reactor is a reaction kettle having a large liquid circulation throughput of 10 $m^3/h$ to 40 $m^3/h$. The reaction kettle is an induction draft tube structure, and has a base solution before adding the first mixed solution and first alkaline solution. The base solution is a blank base solution, for example, the base solution may be deionized water. A liquid level of the base solution is about 10 cm to about 100 cm higher than a feed inlet of the reaction kettle. In other words, the feed inlet of the reaction kettle is located below the liquid level of the base solution. So a solution added into the reaction kettle can be dispersed quickly.

Specifically, the first mixed solution and the first alkaline solution are added into the first reactor, and then the first complexing agent is continuously added into the first reactor. In least one embodiment, the first complexing agent may be ammonium hydroxide. A concentration of the ammonium hydroxide in the first reactor gradually increases from 0 g/L to 45 g/L. The ammonium hydroxide is continuously added for 1 hour to 24 hours. In another embodiment, the first complexing agent may be selected from a group consisting of ammonium sulfate, ethylenediaminetetraacetic acid (EDTA), sodium bicarbonate, oxalic acid, and any combination thereof.

The first mixed solution reacts with the first alkaline solution and the ammonium hydroxide to generate a precipitation, thereby forming a solid-liquid mixture in the first reactor. In at least one embodiment, the first mixed solution reacts with the first alkaline solution and the ammonium hydroxide at a potential of hydrogen value of 10.5 to 12.8 and at a temperature of 40 degrees Celsius to 80 degrees Celsius.

In at least one embodiment, hydroxide ions of the first alkaline solution added into the first reactor and metal cations of the first mixed solution added into the first reactor are in a molar ratio of 0.5:1 to 2.8:1. The metal cations comprises the nickel ions, the cobalt ions and the manganese ions in the first mixed solution. The first alkaline solution can be selected from at least one of sodium hydroxide solution and potassium hydroxide solution.

In the first reactor, nickel ions, cobalt ions and manganese ions combine with the hydroxide ions of the first alkaline solution and hydroxide ions of the ammonium hydroxide, to form nickel hydroxide, cobalt hydroxide and manganese hydroxide, respectively. The crystal seeds are particles formed by a mixture of the nickel hydroxide, cobalt hydroxide and manganese hydroxide. Each crystal seed has a diameter of 1 μm to 9 μm.

At block 103, the crystal seeds, a second complexing agent, a second mixed solution, and a second alkaline solution are added into a second reactor to react and form a slurry having sediments.

In at least one embodiment, the second reactor is a reaction kettle having a large liquid circulation flux. The reaction kettle is an induction draft tube structure. Specifically, the crystal seeds, the second complexing agent, the second mixed solution, and the second alkaline solution are added into the second reactor in the order written to react and form the slurry having sediments. Each crystal seed in the second reactor act as a particle core and continues to grow to form the sediment.

The second mixed solution is formed by dissolving a nickel source, a cobalt source and a manganese source in a deionized water. The second mixed solution comprises nickel ions, cobalt ions and manganese ions. In at least one embodiment, the nickel source, the cobalt source and the manganese source of the second mixed solution may be selected from the nickel source, the cobalt source and the manganese source of the first mixed solution, respectively. Further, the nickel source, the cobalt source and the manganese source of the second mixed solution may be the same as the nickel source, the cobalt source and the manganese source of the first mixed solution. In another embodiment, the nickel source, the cobalt source and the manganese source of the second mixed solution can be different from the nickel source, the cobalt source and the manganese source of the first mixed solution.

In at least one embodiment, a molar concentration of the nickel ions, a molar concentration of the cobalt ions and a molar concentration of the manganese ions of the second mixed solution may be the same as a molar concentration of the nickel ions, a molar concentration of the cobalt ions and a molar concentration of the manganese ions of the first mixed solution, respectively. In another embodiment, the molar concentration of the nickel ions, the molar concentration of the cobalt ions and the molar concentration of the manganese ions of the second mixed solution may be different from the molar concentration of the nickel ions, the molar concentration of the cobalt ions and the molar concentration of the manganese ions of the first mixed solution, respectively.

The second complexing agent may be selected from a group consisting of ammonium hydroxide, ammonium sulfate, EDTA, sodium bicarbonate, oxalic acid, and any combination thereof. In at least one embodiment, the second complexing agent may be the same as the first complexing agent. In another embodiment, the second complexing agent may be different from the first complexing agent. In illustrated embodiment, the second complexing agent is ammonium hydroxide. Ammonia of the ammonium hydroxide has a concentration of 1.0% to 20.0%. The ammonium hydroxide is continuously added into the second reactor by a metering pump.

In at least one embodiment, metal cations of the second mixed solution added into the second reactor have a molar concentration of 0.5 mol/L to 2.8 mol/L. The metal cations of the second mixed solution comprises nickel ions, cobalt ions and manganese ions in the first mixed solution. The metal cations of the second mixed solution and the metal cations of the first mixed solution are in a molar ratio of 0.4:1 to 1.5:1.

The crystal seeds, the second complexing agent, the second mixed solution and the second alkaline solution react at a potential of hydrogen value of 10.5 to 12.8.

In at least one embodiment, a solid content of the slurry can be adjusted by a filtration return process. The filtration return process is defined as filtering part of the slurry to separate the sediments from filtered liquid, returning the sediments into the second reactor, and draining the filtered liquid. In at least one embodiment, the slurry in the second reactor maintains the solid content of 700 g/L to 1600 g/L. The solid content of the slurry can be adjusted by the filtration return process for 1 hour to 12 hours.

At block 104, the slurry is transferred from the second reactor into an aging tank for further chemical reactions, and a process of solid-liquid separation of the slurry is carried out to obtain the sediments. The separated sediments are washed by a deionized water.

In at least one embodiment, after transferring the slurry from the second reactor into the aging tank, a third alkaline solution is added into the slurry to adjust a potential of hydrogen value of during the further chemical reactions in the aging tank to be between 10 and 13, and a mixture comprising the slurry and the third alkaline solution in the aging tank is stirred. The nickel ions, the cobalt ions and the manganese ions in the slurry react with hydroxide ions to continuously generate sediments. In at least one embodiment, after the further chemical reactions, the slurry in the aging tank is transferred to a plate-and-frame filter press for the solid-liquid separation to obtain the sediments. The separated sediments are washed by the deionized water until a potential of hydrogen value of the sediments is less than 8.

In at least one embodiment, the third alkaline solution is selected from at least one of sodium hydroxide solution and potassium hydroxide solution.

At block 105, ternary precursor particles are obtained by drying the separated sediments in an oxygen-rich atmosphere.

Figure 2:
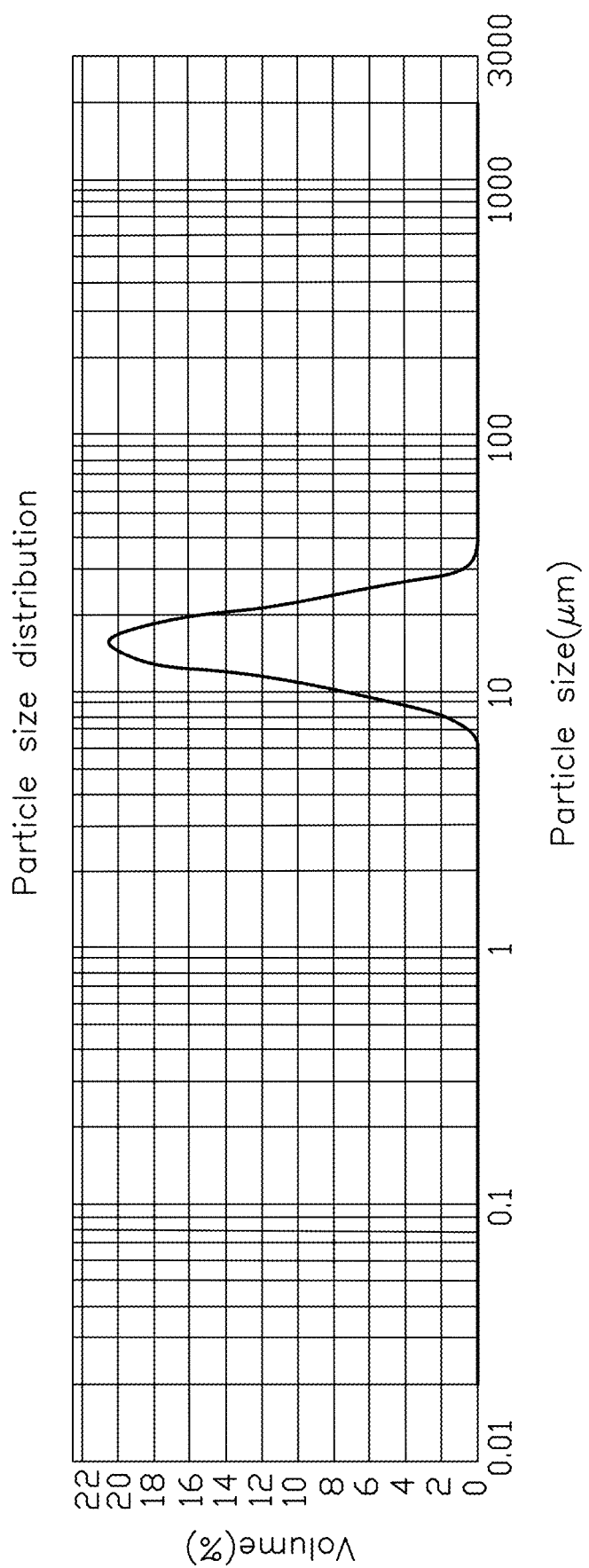
FIG. 2 shows the particle size distribution of an embodiment of the method for manufacturing ternary precursor particles.
Figure 3:
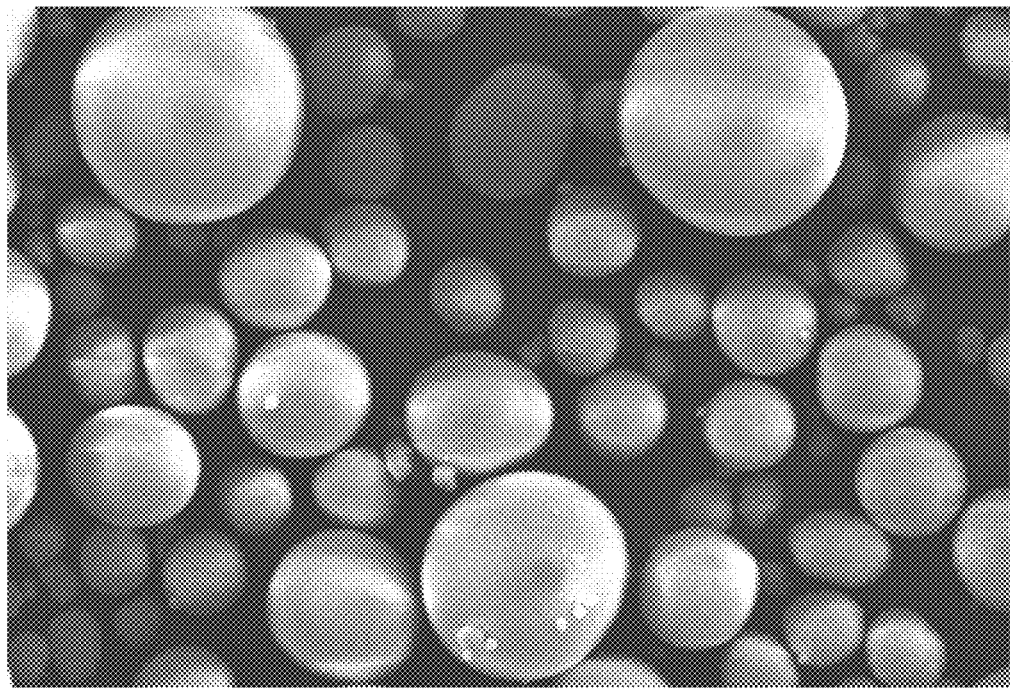
FIG. 3 shows micro morphology of an embodiment of the ternary precursor particles.
Figure 4:
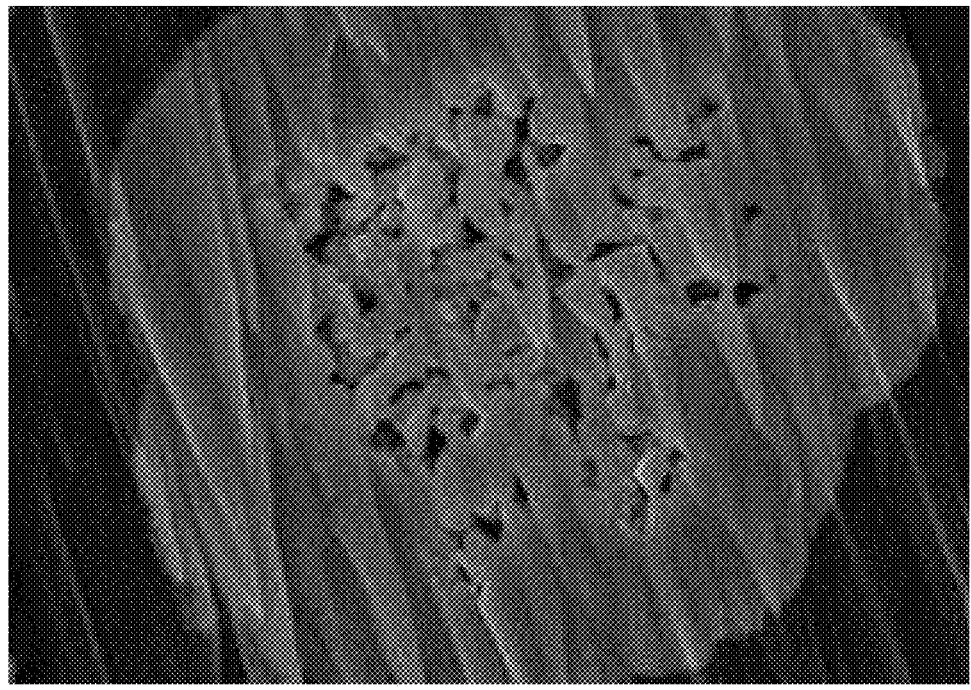
FIG. 4 is a sectional view of one of the ternary precursor particles of FIG. 3.

Each sediment is formed by mixing the nickel hydroxide, the cobalt hydroxide and the manganese hydroxide at the atomic level. In at least one embodiment, the separated sediments are dried at a temperature of 270 degrees Celsius to 350 degrees Celsius in an oxygen-rich atmosphere for 1 hour to 4 hours in a rotary kiln. Each ternary precursor particle has a porosity of 20% to 70%. Each ternary precursor particle comprises the particle core and a shell. The porosity can be adjusted by change a thickness ratio of the shell to the particle core. Each pore of the particle core has a pore diameter of 0.1 μm to 2 μm. FIG. 2 shows the particle size distribution of an embodiment of the method for manufacturing ternary precursor particles. FIG. 3 shows micro morphology of an embodiment of the ternary precursor particles. FIG. 4 is a sectional view of one of the ternary precursor particles.

Figure 5:
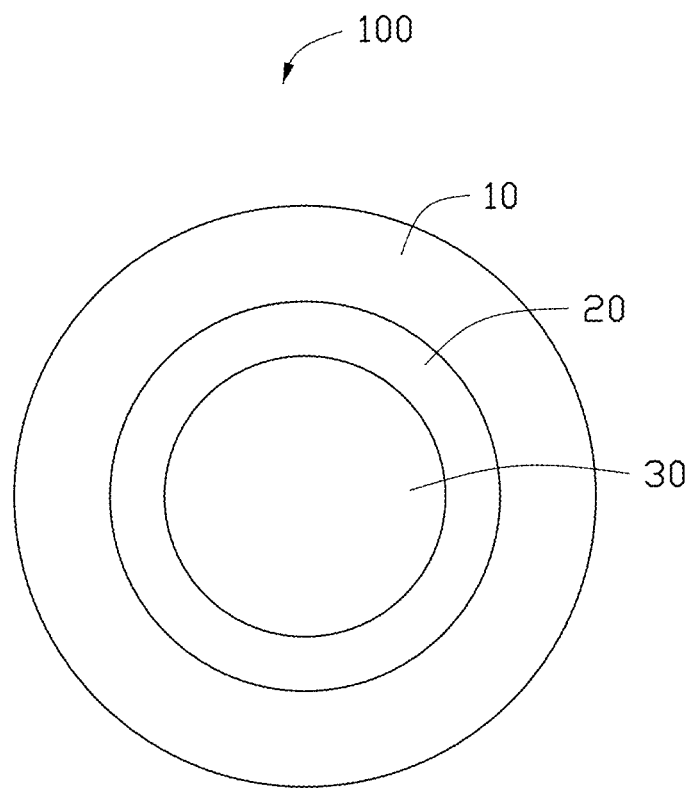
FIG. 5 is a diagrammatic view of an embodiment of a ternary precursor particle.

FIG. 5 illustrates an embodiment of ternary precursor particles 100 compound of $Ni_xCo_yMn_z(OH)_2$. Wherein, $x+y+z=1$, $0<x<1$, $0<y<1$, $0<z<1$. Each of the ternary precursor particles 100 is a spheroidal structure, and comprises a shell 10, a transition layer 20 and a particle core 30. The shell 10 is a dense structure, and the particle core 30 is a porous structure. The transition layer 20 surrounds the particle core 30 and is sandwiched between the shell 10 and the particle core 30.

A tap density of the shell 10, a tap density of the transition layer 20 and a tap density of the particle core 30 are different. The tap density of the shell 10 is greater than the tap density of the particle core 30. The tap density of the transition layer 20 is less than the tap density of the shell 10, and greater than the tap density of the particle core 30.

A crystallinity of the shell 10 is greater than a crystallinity of the transition layer 20, and the crystallinity of the transition layer 20 is greater than a crystallinity of the particle core 30.

In at least one embodiment, the shell 10 has a thickness of 0.5 μm to 10 μm. The tap density of the shell 10 is greater than or equal to 2.5 g/cm³. A diameter of the particle core 30 is less than 10 μm, and the tap density of the particle core 30 is less than or equal to 3.0 g/cm³. A thickness of the transition layer 20 is less than 2 μm. In another embodiment, the tap density and the thickness of the shell 10 can be varied as needed.

In at least one embodiment, the thickness of the shell 10 and the diameter of the particle core 30 are in a ratio of 1:1 to 1:9. The tap density of the particle core 30 increases gradually from an interior of the particle core 30 to a circumferential region of the particle core 30. Specifically, the tap density of the particle core 30 distributes in a dense layered gradient, and the dense layered gradient is between 2.0 g/cm³ to 4.2 g/cm³.

In at least one embodiment, the ternary precursor particles 100 have a particle diameter of 1 μm to 40 μm. D50 of the ternary precursor particles 100 is between 2 μm and 18 and (D5+D95):D50≤2.2:1. Wherein, D50 denotes a diameter value of abscissa corresponding to 50% of ordinate accumulation distribution of the ternary precursor particles; D5 denotes a diameter value of abscissa corresponding to 5% of ordinate accumulation distribution of the ternary precursor particles; D95 denotes a diameter value of abscissa corresponding to 95% of ordinate accumulation distribution of the ternary precursor particles.

The present disclosure further provides a ternary material. The ternary precursor particles 100 and a lithium source are mixed and sintered in pure oxygen or air atmosphere at a temperature of 700 degrees Celsius to 1200 degrees Celsius to form the ternary material. The lithium source may be selected from a group consisting of lithium hydroxide, lithium nitrate, lithium sulfate, lithium chloride, lithium fluoride, lithium carbonate, lithium oxalate, and any combination thereof. In at least one embodiment, the ternary material may further comprises metal cations or anions. The metal cations can be selected from a group consisting of Al, Ca, Na, Ti, Mg, Zr, W, and any combination thereof. The anions can be selected from a group consisting of S, Cl, F, and any combination thereof.

The present disclosure further provides a lithium-ion battery. The lithium-ion battery includes the ternary material. The lithium-ion battery has a capacity retention ratio greater than or equal to 88% after 2000 times of charge-discharge cycles under a rate of 20 C.

A surface of each sediment in the aging tank can be modified by the further chemical reaction, thereby improving performances of the ternary precursor particles. The method can control a morphology and the particle diameter of the ternary precursor particles. The method is simple and controllable, which is suitable for industrial production. The crystallinity of the shell is different from the crystallinity of the particle core. The ternary material using the ternary precursor particles has good rate capability and good in cyclicity. So the ternary material can be used in a vehicle power battery.

Embodiment 1

Nickel nitrate, cobalt nitrate and manganese nitrate were dissolved in a deionized water to form a first mixed solution. Nickel ions, cobalt ions and manganese ions in the first mixed solution were in a molar ratio of 5:2:3.

The first mixed solution was added into a first reactor having a large liquid circulation flux of 25 m³/h. Ammonium hydroxide and a first alkaline solution were added into the first reactor at a constant rate. A concentration of the ammonium hydroxide in the first reactor gradually increased from 0 g/L to 30 g/L, and the ammonium hydroxide were added for 12 hours. Hydroxide ions of the first alkaline solution and metal cations of the first mixed solution were in a molar ratio of 0.5:1. The first alkaline solution was sodium hydroxide solution.

The first mixed solution reacted with hydroxide ions in the first reactor to generate crystal seeds as precipitates at a temperature of 60 degrees Celsius. The crystal seeds had diameters ranging from 1 μm to 7 μm.

The crystal seeds, a second complexing agent, a second mixed solution, and a second alkaline solution were added into a second reactor in the order written to react and form a slurry having sediments at a potential of hydrogen value of 10.5 to 12.8.

The second reactor had a large liquid circulation flux of 25 m³/h. The second complexing agent was ammonium hydroxide. The second alkaline solution was sodium hydroxide solution. Metal cations of the second mixed solution and hydroxide ions of the second alkaline solution were in a molar ratio of 1:1.

The second mixed solution was formed by dissolving nickel nitrate, cobalt nitrate and manganese nitrate in a deionized water. Nickel ions, cobalt ions and manganese ions in the second mixed solution were in a molar ratio of 5:2:3. A solid content of the slurry maintained 1000 g/L by a filtration return process.

The slurry was transferred from the second reactor to an aging tank for further chemical reactions at a potential of hydrogen value of 10. The sediments were obtained by a filter press for the solid-liquid separation, and washed by deionized water until a potential of hydrogen value of the sediments is less than 8.

Ternary precursor particles were obtained by drying the separated sediments at a temperature of 300 degrees Celsius in an oxygen-rich atmosphere for 3 hours. D50 of the ternary precursor particles was 16 μm.

Embodiment 2

Nickel sulfate, cobalt sulfate and manganese sulfate were dissolved in a deionized water to form a first mixed solution. Nickel ions, cobalt ions and manganese ions in the first mixed solution were in a molar ratio of 3:3:3.

The first mixed solution was added into a first reactor having a large liquid circulation flux of 15 $m^3/h$. Ammonium hydroxide and a first alkaline solution were added into the first reactor at a constant rate. A concentration of the ammonium hydroxide in the first reactor gradually increased from 0 g/L to 15 g/L, and the ammonium hydroxide were added for 24 hours. Hydroxide ions of the first alkaline solution and metal cations of the first mixed solution were in a molar ratio of 1:1. The first alkaline solution was sodium hydroxide solution.

The first mixed solution reacted with hydroxide ions in the first reactor to generate crystal seeds as precipitates at a temperature of 40 degrees Celsius. The crystal seeds had diameters ranging from 3 μm to 9 μm.

The crystal seeds, a second complexing agent, a second mixed solution, and a second alkaline solution were added into a second reactor in the order written to react and form a slurry having sediments at a potential of hydrogen value of 11 to 12.

The second reactor had a large liquid circulation flux of 15 $m^3/h$. The second complexing agent was ammonium hydroxide. The second alkaline solution was sodium hydroxide solution. Metal cations of the second mixed solution and hydroxide ions of the second alkaline solution were in a molar ratio of 1.5:1.

The second mixed solution was formed by dissolving nickel sulfate, cobalt sulfate and manganese sulfate in a deionized water. Nickel ions, cobalt ions and manganese ions in the second mixed solution were in a molar ratio of 3:3:3. A solid content of the slurry maintained 700 g/L by a filtration return process.

The slurry was transferred from the second reactor to an aging tank for further chemical reactions at a potential of hydrogen value of 11. The sediments were obtained by a filter press for the solid-liquid separation, and washed by deionized water until a potential of hydrogen value of the sediments is less than 8.

Ternary precursor particles were obtained by drying the separated sediments at a temperature of 330 degrees Celsius in an oxygen-rich atmosphere for 3 hours. D50 of the ternary precursor particles was 2 μm.

Embodiment 3

Nickel chloride, cobalt chloride and manganese chloride were dissolved in a deionized water to form a first mixed solution. Nickel ions, cobalt ions and manganese ions in the first mixed solution were in a molar ratio of 8:1:1.

The first mixed solution was added into a first reactor having a large liquid circulation flux of 40 $m^3/h$. Ammonium hydroxide and a first alkaline solution were added into the first reactor at a constant rate. A concentration of the ammonium hydroxide in the first reactor gradually increased from 0 g/L to 45 g/L, and the ammonium hydroxide were added for 1 hour. Hydroxide ions of the first alkaline solution and metal cations of the first mixed solution were in a molar ratio of 1.5:1. The first alkaline solution was sodium hydroxide solution.

The first mixed solution reacted with hydroxide ions in the first reactor to generate crystal seeds as precipitates at a temperature of 80 degrees Celsius. The crystal seeds had diameters ranging from 1 μm to 9 μm.

The crystal seeds, a second complexing agent, a second mixed solution, and a second alkaline solution were added into a second reactor in the order written to react and form a slurry having sediments at a potential of hydrogen value of 10.5 to 11.5.

The second reactor had a large liquid circulation flux of 40 $m^3/h$. The second complexing agent was ammonium hydroxide. The second alkaline solution was sodium hydroxide solution. Metal cations of the second mixed solution and hydroxide ions of the second alkaline solution were in a molar ratio of 1:1.

The second mixed solution was formed by dissolving nickel chloride, cobalt chloride and manganese chloride in a deionized water. Nickel ions, cobalt ions and manganese ions in the second mixed solution were in a molar ratio of 8:1:1. A solid content of the slurry maintained 1600 g/L by a filtration return process.

The slurry was transferred from the second reactor to an aging tank for further chemical reactions at a potential of hydrogen value of 13. The sediments were obtained by a filter press for the solid-liquid separation, and washed by deionized water until a potential of hydrogen value of the sediments is less than 8.

Ternary precursor particles were obtained by drying the separated sediments at a temperature of 350 degrees Celsius in an oxygen-rich atmosphere for 3 hours. D50 of the ternary precursor particles was 18 μm.

Embodiment 4

Nickel sulfate, cobalt sulfate and manganese sulfate were dissolved in a deionized water to form a first mixed solution. Nickel ions, cobalt ions and manganese ions in the first mixed solution were in a molar ratio of 8:1:1.

The first mixed solution was added into a first reactor having a large liquid circulation flux of 30 $m^3/h$. Ammonium hydroxide and a first alkaline solution were added into the first reactor at a constant rate. A concentration of the ammonium hydroxide in the first reactor gradually increased from 0 g/L to 40 g/L, and the ammonium hydroxide were added for 5 hours. Hydroxide ions of the first alkaline solution and metal cations of the first mixed solution were in a molar ratio of 0.5:1. The first alkaline solution was sodium hydroxide solution.

The first mixed solution reacted with hydroxide ions in the first reactor to generate crystal seeds as precipitates at a potential of hydrogen value of 12 and a temperature of 70 degrees Celsius. The crystal seeds had diameters ranging from 5 μm to 9 μm.

The crystal seeds, a second complexing agent, a second mixed solution, and a second alkaline solution were added into a second reactor in the order written to react and form a slurry having sediments at a potential of hydrogen value of 11.5 to 12.8.

The second reactor had a large liquid circulation flux of 30 $m^3/h$. The second complexing agent was ammonium hydroxide. The second alkaline solution was sodium hydroxide solution. Metal cations of the second mixed solution and hydroxide ions of the second alkaline solution were in a molar ratio of 0.8:1.

The second mixed solution was formed by dissolving nickel sulfate, cobalt sulfate and manganese sulfate in a deionized water. Nickel ions, cobalt ions and manganese ions in the second mixed solution were in a molar ratio of 8:1:1. A solid content of the slurry maintained 1200 g/L by a filtration return process.

The slurry was transferred from the second reactor to an aging tank for further chemical reactions at a potential of hydrogen value of 12. The sediments were obtained by a filter press for the solid-liquid separation, and washed by deionized water until a potential of hydrogen value of the sediments is less than 8.

Ternary precursor particles were obtained by drying the separated sediments at a temperature of 300 degrees Celsius in an oxygen-rich atmosphere for 3 hours. D50 of the ternary precursor particles was 15 μm.

Embodiment 5

Nickel sulfate, cobalt sulfate and manganese sulfate were dissolved in a deionized water to form a first mixed solution. Nickel ions, cobalt ions and manganese ions in the first mixed solution were in a molar ratio of 6:2:2.

The first mixed solution was added into a first reactor having a large liquid circulation flux of 25 $m^3$/h. Ammonium hydroxide and a first alkaline solution were added into the first reactor at a constant rate. A concentration of the ammonium hydroxide in the first reactor gradually increased from 0 g/L to 20 g/L, and the ammonium hydroxide were added for 20 hours. Hydroxide ions of the first alkaline solution and metal cations of the first mixed solution were in a molar ratio of 0.5:1. The first alkaline solution was sodium hydroxide solution.

The first mixed solution reacted with hydroxide ions in the first reactor to generate crystal seeds as precipitates at a temperature of 70 degrees Celsius. The crystal seeds had diameters ranging from 1 μm to 9 μm.

The crystal seeds, a second complexing agent, a second mixed solution, and a second alkaline solution were added into a second reactor in the order written to react and form a slurry having sediments at a potential of hydrogen value of 12 to 12.8.

The second reactor had a large liquid circulation flux of 30 $m^3$/h. The second complexing agent was ammonium hydroxide. The second alkaline solution was sodium hydroxide solution. Metal cations of the second mixed solution and hydroxide ions of the second alkaline solution were in a molar ratio of 1.5:1.

The second mixed solution was formed by dissolving nickel sulfate, cobalt sulfate and manganese sulfate in a deionized water. Nickel ions, cobalt ions and manganese ions in the second mixed solution were in a molar ratio of 6:2:2. A solid content of the slurry maintained 900 g/L by a filtration return process.

The slurry was transferred from the second reactor to an aging tank for further chemical reactions at a potential of hydrogen value of 12.5. The sediments were obtained by a filter press for the solid-liquid separation, and washed by deionized water until a potential of hydrogen value of the sediments is less than 8.

Ternary precursor particles were obtained by drying the separated sediments at a temperature of 270 degrees Celsius in an oxygen-rich atmosphere for 3 hours. D50 of the ternary precursor particles was 8 μm.

Embodiment 6

Nickel sulfate, cobalt sulfate and manganese sulfate were dissolved in a deionized water to form a first mixed solution. Nickel ions, cobalt ions and manganese ions in the first mixed solution were in a molar ratio of 4:4:2.

The first mixed solution was added into a first reactor having a large liquid circulation flux of 25 $m^3$/h. Ammonium hydroxide and a first alkaline solution were added into the first reactor at a constant rate. A concentration of the ammonium hydroxide in the first reactor gradually increased from 0 g/L to 20 g/L, and the ammonium hydroxide were added for 20 hours. Hydroxide ions of the first alkaline solution and metal cations of the first mixed solution were in a molar ratio of 0.5:1. The first alkaline solution was sodium hydroxide solution.

The first mixed solution reacted with hydroxide ions in the first reactor to generate crystal seeds as precipitates at a temperature of 70 degrees Celsius. The crystal seeds had diameters ranging from 1 μm to 9 μm.

The crystal seeds, a second complexing agent, a second mixed solution, and a second alkaline solution were added into a second reactor in the order written to react and form a slurry having sediments at a potential of hydrogen value of 12 to 12.8. The second reactor had a large liquid circulation flux of 30 $m^3$/h. The second complexing agent was ammonium hydroxide.

The second alkaline solution was sodium hydroxide solution. Metal cations of the second mixed solution and hydroxide ions of the second alkaline solution were in a molar ratio of 1.5:1.

The second mixed solution was formed by dissolving nickel sulfate, cobalt sulfate and manganese sulfate in a deionized water. Nickel ions, cobalt ions and manganese ions in the second mixed solution were in a molar ratio of 6:2:2. A solid content of the slurry maintained 900 g/L by a filtration return process.

The slurry was transferred from the second reactor to an aging tank for further chemical reactions at a potential of hydrogen value of 12.5. The sediments were obtained by a filter press for the solid-liquid separation, and washed by deionized water until a potential of hydrogen value of the sediments is less than 8.

Ternary precursor particles were obtained by drying the separated sediments at a temperature of 270 degrees Celsius in an oxygen-rich atmosphere for 3 hours. D50 of the ternary precursor particles was 8 μm.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for manufacturing ternary precursor particles comprising:
    dissolving a nickel source, a cobalt source and a manganese source in a deionized water to form a first mixed solution comprising nickel ions, cobalt ions and manganese ions;
    adding the first mixed solution and a first alkaline solution into a first reactor, and adding a first complexing agent into the first reactor, the first mixed solution reacting with hydroxide ions in the first reactor to generate crystal seeds; wherein the first reactor comprises a base solution before adding the first mixed solution and a first alkaline solution into a first reactor, a liquid level of the base solution is higher than a feed inlet of the reactor;

adding the crystal seeds, a second complexing agent, a second mixed solution, and a second alkaline solution into a second reactor to chemically react and form a slurry comprising sediments, wherein the second mixed solution is formed by dissolving a nickel source, a cobalt source and a manganese source in a deionized water, a solid content of the slurry in the second reactor is adjusted by a filtration return process for 1 hour to 12 hours to be maintained from 700 g/L to 1600 g/L;

transferring the slurry into an aging tank for further chemical reactions, separating the sediments from the slurry by a solid-liquid separation process, and washing the separated sediments by deionized water; and drying the sediments from the aging tank in an oxygen-rich atmosphere to obtain the ternary precursor particles, the precursor particles being a spheroidal structure and comprising a shell, a particle core of a porous structure, and a transition layer surrounding the particle core and sandwiched between the shell and the particle core, wherein a density of the shell is greater than a density of the particle core.

2. The method for manufacturing ternary precursor particles of claim 1, wherein the first reactor and the second reactor are reaction kettles having a large liquid circulation throughput of 10 m$^3$/h to 40 m$^3$/h, each of the reaction kettles is an induction draft tube structure.

3. The method for manufacturing ternary precursor particles of claim 1, wherein the first complexing agent is continuously added into the first reactor for 1 hour to 24 hours, a concentration of the first complexing agent gradually increasing from 0 g/L to 45 g/L.

4. The method for manufacturing ternary precursor particles of claim 1, wherein the first mixed solution reacts with the hydroxide ions in the first reactor at a pH value of 10.5 to 12.8 and a temperature of 40 degrees Celsius to 80 degrees Celsius.

5. The method for manufacturing ternary precursor particles of claim 1, wherein crystal seeds each has a diameter ranging from 1 μm to 9 μm.

6. The method for manufacturing ternary precursor particles of claim 1, wherein the crystal seeds, the second complexing agent, the second mixed solution and the second alkaline solution chemically react at a pH value of 10.5 to 12.8.

7. The method for manufacturing ternary precursor particles of claim 1, wherein the separated sediments are dried at a temperature of 270 degrees Celsius to 350 degrees Celsius for 1 hour to 4 hours.

8. The method for manufacturing ternary precursor particles of claim 1, wherein each of the first alkaline solution and the second alkaline solution is selected from at least one of sodium hydroxide solution and potassium hydroxide solution; each of the first complexing agent and the second complexing agent is selected from a group consisting of ammonium hydroxide, ammonium sulfate, ethylenediaminetetraacetic acid, sodium bicarbonate, oxalic acid, and any combination thereof.

9. The method for manufacturing ternary precursor particles of claim 1, wherein hydroxide ions of the first alkaline solution and metal cations of the first mixed solution are in a molar ratio of 0.5:1 to 2.8:1.

10. The method for manufacturing ternary precursor particles of claim 1, wherein a ratio of a molar concentration of metal cations in the second mixed solution to a molar concentration of the metal cations in the first mixed solution is 0.4 to 1.5.

11. The method for manufacturing ternary precursor particles of claim 1, wherein the further chemical reactions in the aging tank occurs at a pH value of 10 to 13.

12. The method for manufacturing ternary precursor particles of claim 1, wherein the sediments from the aging tank are washed by the deionized water until a pH value of the sediments is less than 8.

* * * * *